Sept. 13, 1960    A. L. RUCK ET AL    2,952,037
PROCESS FOR FORMING PLASTIC BINDERS
Filed Sept. 14, 1956    4 Sheets-Sheet 1
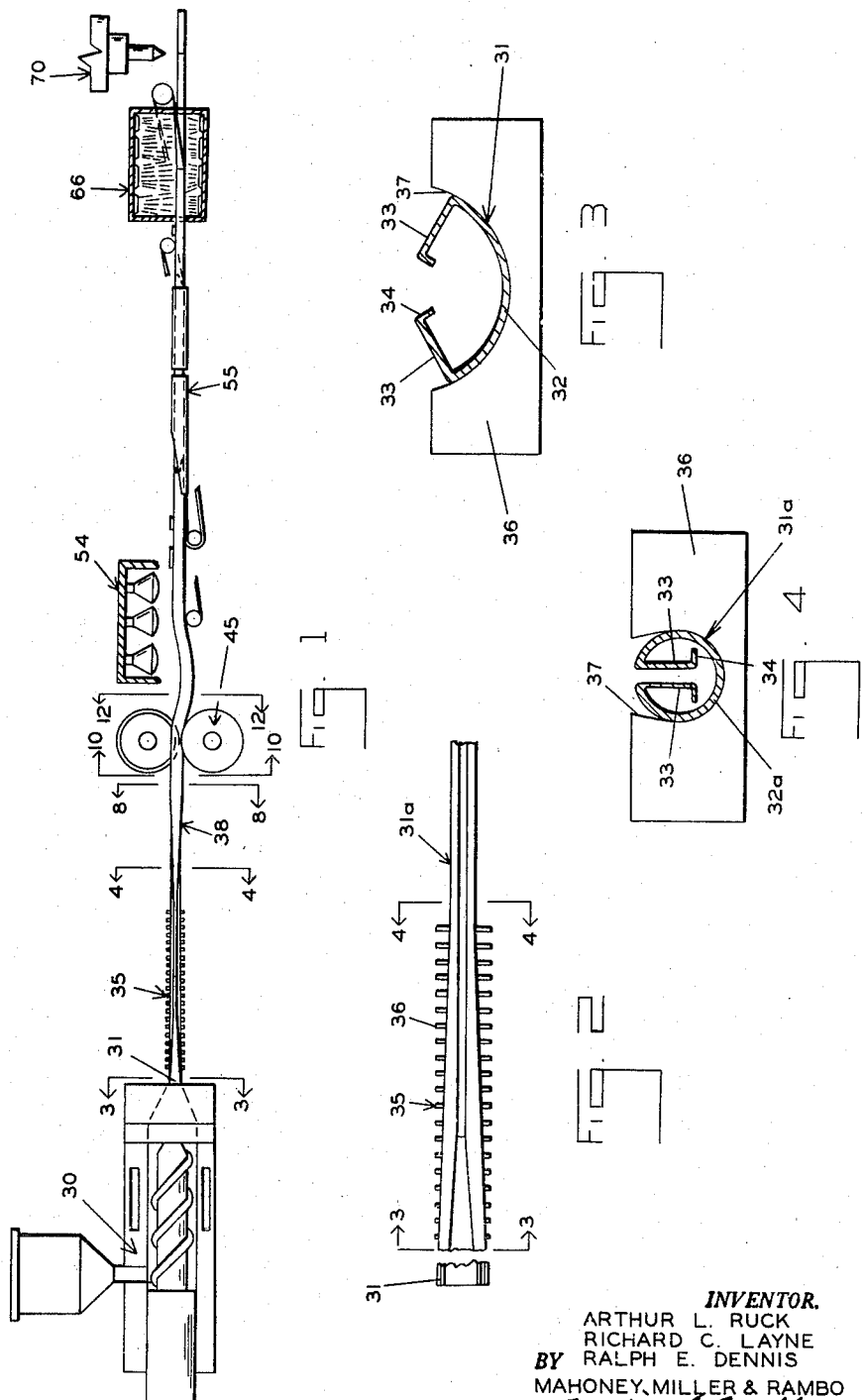
INVENTOR.
ARTHUR L. RUCK
RICHARD C. LAYNE
BY RALPH E. DENNIS
MAHONEY, MILLER & RAMBO
BY    ATTORNEYS

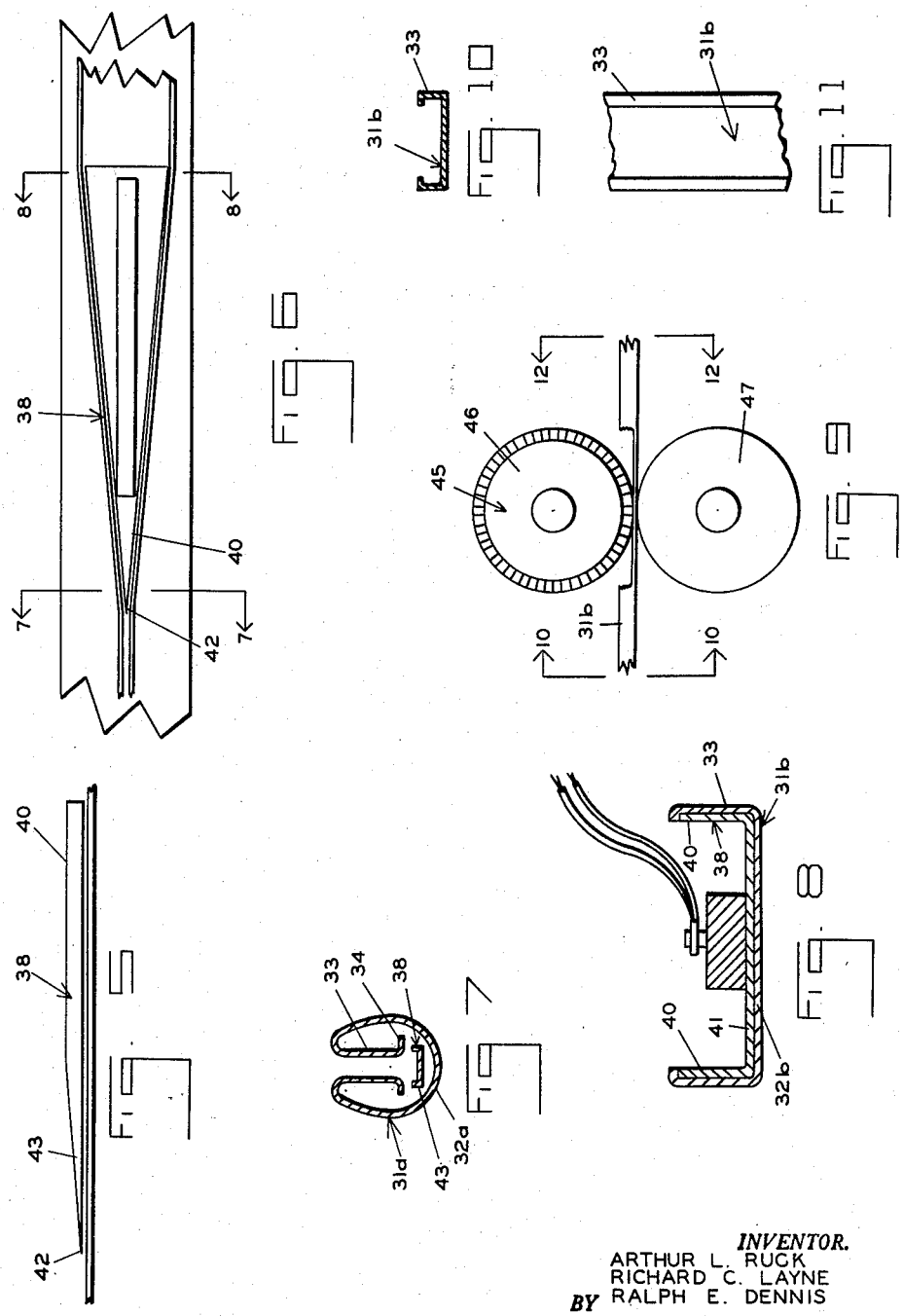

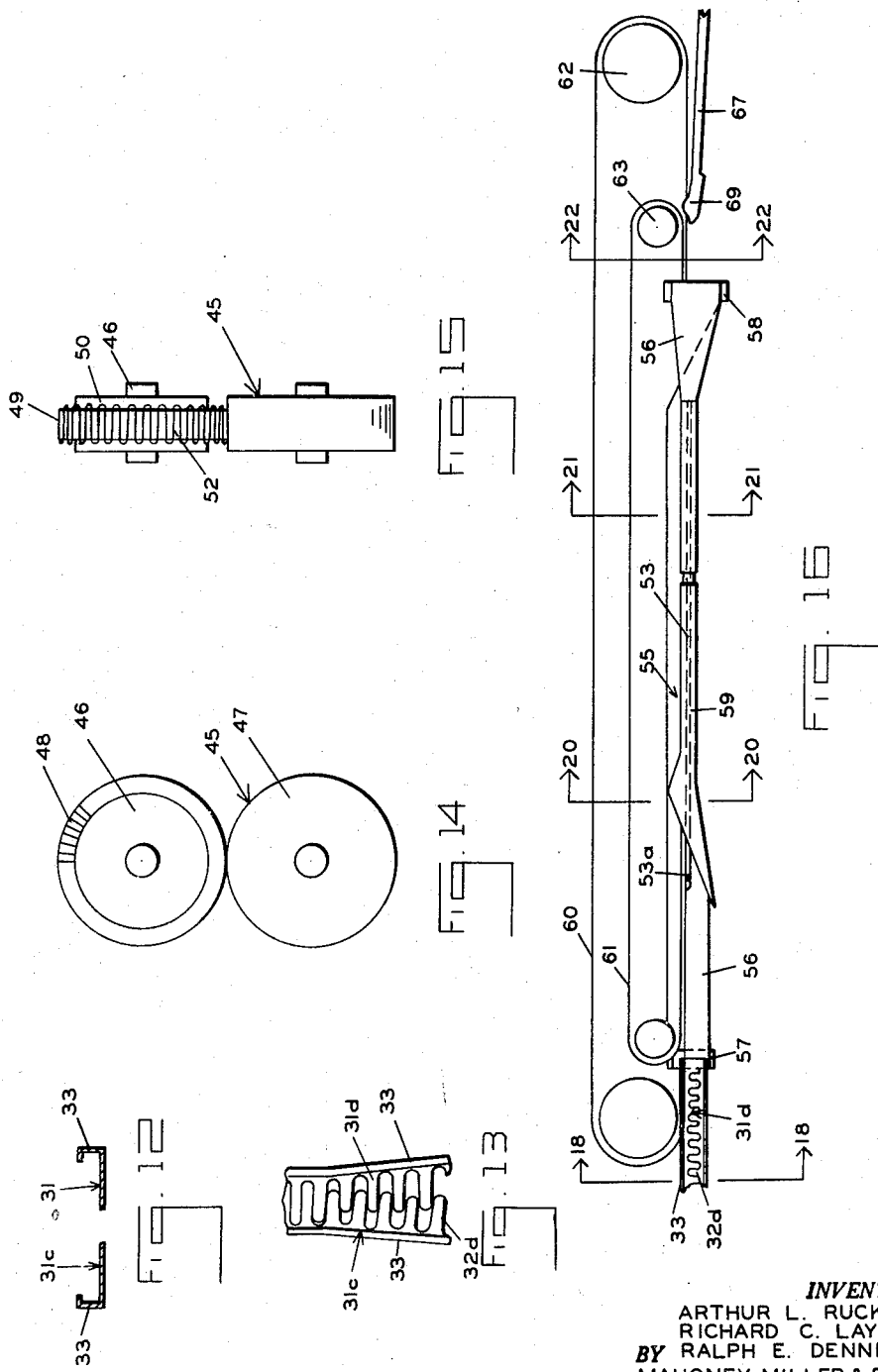

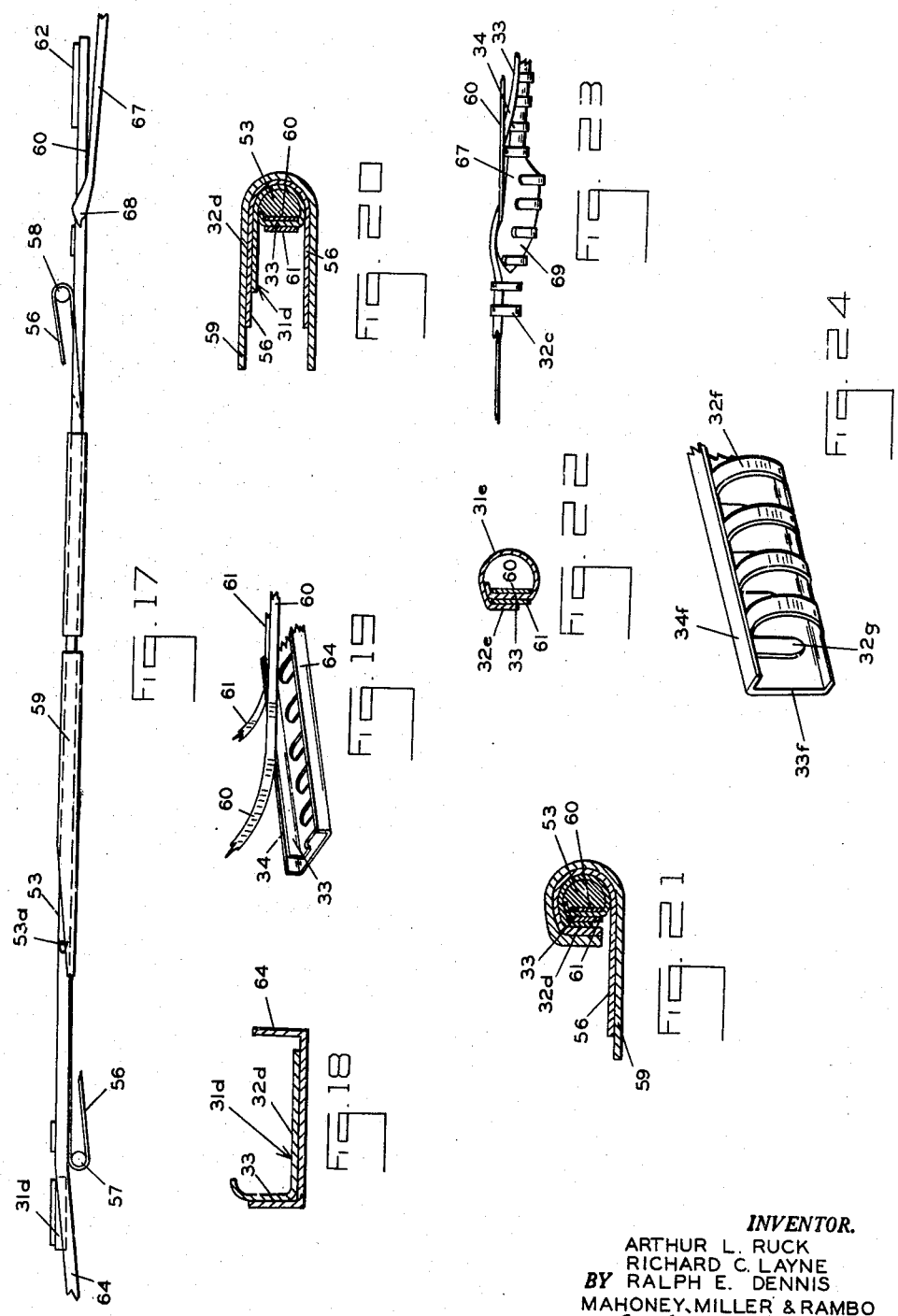

United States Patent Office 2,952,037
Patented Sept. 13, 1960

2,952,037

PROCESS FOR FORMING PLASTIC BINDERS

Arthur L. Ruck, 4078 Sexton Drive, Columbus 4, Ohio; Richard C. Layne, 89 Coolidge Ave., Columbus, Ohio; and Ralph E. Dennis, 1841 N. Starr Road, Columbus, Ohio Filed Sept. 14, 1956, Ser. No. 610,011

7 Claims. (Cl. 18—47.5)

Our invention relates to a process for forming plastic binders. It has to do, more specifically, with a process for forming plastic binders of the general type disclosed in the United States patent to Douvry No. 1,970,285 which issued August 14, 1934.

This application is a continuation-in-part of our copending application Serial No. 568,595 which was, in turn, a continuation-in-part of our copending application Serial No. 538,887, now abandoned.

This type of binder is commonly in use as a loose-leaf binder and is made of thermoplastic material. It consists of a longitudinally extending backbone of substantially semi-circular form having binder rings extending from one edge thereof into overlapping or meeting relationship to the other edge thereof. The rings of this type of binder normally tend to stay in operative position where the free ends of the rings overlap or meet the backbone. However, the thermoplastic material has sufficient elasticity so that the free ends of the rings can be bent away from the backbone to permit the assembly or removal of properly punched loose-leaf sheets in relationship to the binder. Thermoplastic materials which have been used in producing this type of binder are vinyl resins such as Vinylite, cellulose acetates, butyrates, ethyl cellulose, Celluloid, and pyroxylin, as well as others.

Prior to our development of the method disclosed in Serial No. 538,887, various methods had been provided for producing this general type of binder. All prior art methods with which we were familiar and which were in commercial use formed the binders in several separate and distinct operations from flat sheets or blanks. These prior art processes are slow and are, therefore, not suitable for mass production, require much skilled labor, and are wasteful insofar as material is concerned and, because of these factors, are quite expensive. Also, they do not use natural properties of the plastic to best advantage.

In our copending application Serial No. 538,887 we disclosed a novel extrusion process for forming these binders. The process disclosed in our application Serial No. 568,595 included the basic steps of the first disclosed process but included additional steps whereby the "memory" factor of the extruded plastic was utilized in keeping the free ends of the rings in association with the backbone of the completed binder. The present invention employs basic steps of the two previously disclosed processes and utilizes the "memory" factor but also provides refinements in the extrusion and finger-forming operations to eliminate waste of material almost completely and in the reforming operations to bring the binder blank under control accurately into its final form.

In the plastic art the "memory" factor in an extruded thermoplastic article which has been subjected to subsequent reheating and reforming operations is defined as the tendency the plastic has to revert to its original extruded form upon reheating to relieve the tension therein. This is a pronounced tendency as is well-known in the art. In the present process this tendency is employed, as indicated above, to retain the rings in proper association with the backbone of the finished binder so that it will effectively bind the loose-leaf sheets.

According to our process, the thermoplastic material for the binder is extruded as a continuous double blank which cross-sectional shape will be of flat arcuate form with flanges on each edge directed inwardly and upwardly towards each other. Each of the flanges is substantially in the form that the final backbone of the finished binder will have and the flat arcuate section between the flanges is of sufficient width to provide for the formation therefrom of fingers of proper length and which in the finished binder will be curled into association with the backbone to serve as sheet-retaining binder rings. To establish a memory factor, which in the finished binder will always tend to cause the fingers to curl up and extend into association with the backbone even under high-temperature conditions, before the plastic material of the double blank sets, the blank is reformed by curling the flat arcuate finger-forming section into a curvature of shorter radius so that the backbone-forming flanges are disposed side-by-side almost in contact with each other. This increase in sharpness of curvature of the finger-forming section of the blank will, upon setting of the plastic material, create a memory factor which in the finished binder will always tend to cause the fingers to curl into association with the backbone. This reforming of the extruded shape before setting is accomplished during the continuous movement of the blank from the extruding die and as this reforming operation is completed, the material is permitted to set. The next step is subjecting the continuously moving blank to a forming operation, at a suitable temperature below the softening point of the plastic material, which will flatten the blank into a flat U-form with the finger-forming section completely flat transversely and with the backbone-forming flanges upstanding at each edge thereof, in order to permit continuous cutting of the blank. The continuously moving blank is then subjected to a cutting operation which will divide the double blank into two continuous single blanks, each having an upstanding backbone-forming flange and longitudinally spaced ring-forming fingers extending laterally therefrom. This cutting operation is accomplished substantially without the waste of any material of the original double blank. After the cutting operation, each single blank is subjected separately during continuous movement to a reheating and reforming operation. This operation is such that the tension in the material of the flat plastic blank will be relaxed and the fingers will tend to curl up into association with the backbone. However, the reforming operation is carried out in such a manner that the curling of the fingers into association with the backbone will always be under accurate control. After the blank sets, the memory factor will keep the curled fingers or rings in proper association with the backbone. The continuous single blank thus produced having the fingers curled into association with the backbone may then be cut into proper binder lengths during its continuous movement. To use these binders a machine will be provided which will uncurl the fingers to permit slipping of loose-leaf sheets thereon.

In the accompanying drawings, we have illustrated schematically how our process can be performed. In these drawings:

Figure 1 is a diagrammatic view illustrating the successive operations during the continuous extrusion of the binder-forming blank and formation of the blank into the binders.

Figure 2 is a plan view of the reforming guides which receive the double blank as it is extruded from the extrusion die and form it into a suitable shape to establish the desirable memory factor.

Figure 3 is an enlarged transverse sectional view taken along line 3—3 of Figure 2 which is the same position indicated by line 3—3 of Figure 1 showing the shape of the extruded blank as it leaves the extrusion die and rests on the reforming guides.

Figure 4 is an enlarged transverse sectional view taken along line 4—4 of Figure 2 which corresponds to the position of line 4—4 of Figure 1 showing the shape of the blank as it leaves the reforming guides.

Figure 5 is a side elevational view of a reheating and reforming unit which will flatten out the double blank shown in Figure 4 preparatory to cutting.

Figure 6 is a plan view of the unit of Figure 5.

Figure 7 is a transverse sectional view taken along line 7—7 of Figure 6, which corresponds to the position indicated at line 7—7 of Figure 1, and showing the double binder blank as it enters the reforming unit of Figure 6.

Figure 8 is a transverse sectional view taken on line 8—8 of Figure 6, which corresponds to the positon line 8—8 of Figure 1, showing the flattened U-shape of the double binder blank as it leaves the reforming unit of Figure 6.

Figure 9 is a side-elevational view of the cutting unit which cuts the double blank into two single blanks and simultaneously forms the fingers on each.

Figure 10 is a transverse sectional view taken on line 10—10 of Figure 9, corresponding to line 10—10 of Figure 1, showing the shape of the double blank as it enters the cutting unit.

Figure 11 is a plan view of the blank of Figure 10.

Figure 12 is a transverse sectional view taken along line 12—12 of Figure 9, corresponding to line 12—12 of Figure 1, showing the two identical single blanks formed by the cutting unit.

Figure 13 is a plan view of the double blank as it is cut and separated into the two single blanks.

Figure 14 is a side elevational view of the cutting unit showing the upper wheel thereof slotted to receive the continuous band cutting blade.

Figure 15 is an edge view of the cutting unit shown in Figure 14 with the cutting blade in position on the upper wheel.

Figure 16 is a plan view of the reforming unit which reforms the single blank by curling the fingers into association with the backbone of the blank during its continuous movement.

Figure 17 is a side elevational view of the unit of Figure 16.

Figure 18 is a transverse sectional view taken along line 18—18 of Figure 16 showing the shape of the single blank as it enters into the reforming unit of Figures 16 and 17.

Figure 19 is a schematic view in perspective illustrating the entrance of the blank into the reforming unit of Figures 16 and 17 and into association with the propelling bands thereof.

Figure 20 is a transverse sectional view taken along line 20—20 of Figure 16 illustrating our initial stage of the finger curling operation.

Figure 21 is a transverse sectional view taken along line 21—21 of Figure 16 and illustrating the final stage of the finger-forming operation.

Figure 22 is a transverse sectional view taken along line 22—22 of Figure 16 and showing the blank as it leaves the forming unit.

Figure 23 is a diagrammatic view in plan illustrating how the blank is stripped from the bands which propel it through the forming unit.

Figure 24 is a perspective view illustrating the finished binder.

With reference to the drawings, in Figure 1 we have illustrated diagrammatically the successive steps in our continuous process of forming plastic binders of the type indicated.

The material is first continuously extruded from a suitable extrusion machine indicated at 30. This machine will extrude the material in the form of a double blank 31, of the cross-sectional shape illustrated in Figure 3, from any suitable thermoplastic material and the blank can be of a solid color or several longitudinally extending bands of color. It will be noted from Figure 3 that the blank 31 will have a flat arcuate center section 32 and flanges 33 on each edge which are directed inwardly and upwardly towards each other. On the outer edge of each flange 33 is an inwardly directed lip 34. Each of the flanges 33 is substantially in the form that the final backbone of the finished binder will have and the flat arcuate section 32 between the flanges 33 will be the portion from which the longitudinally spaced fingers of the finished binder are formed and this section will be of sufficient width to provide for fingers of proper length. In the finished binder, these fingers will be curled into association with the longitudinally extending continuous backbone to serve as sheet-retaining binder rings.

The desirable memory factor is established by subjecting the double blank 31, as it emerges from the extrusion die, to a reforming unit 35. This reforming operation is accomplished before the plastic material sets and the memory factor established will be of such a nature that it will always tend to cause the fingers in the finished binder to curl up and extend into association with the backbone even under high temperature conditions. The unit 35 (Figures 2 and 4) comprises a series of longitudinally spaced upstanding plates 36 which are provided with centrally disposed upwardly opening notches 37. The notches of successive plates 36 gradually decrease in width and increase in curvature from the inlet to the outlet of the unit 35 so that the blank 31 will be reformed into a double blank 31a of the cross-sectional shape shown in Figure 4. This reforming operation curls the flat arcuate finger-forming section 32 into a section 32a of shorter radius so that the backbone-forming flanges 33 are disposed side-by-side almost in contact with each other. However, it will be noted that in this reforming operation no change has occurred in the shape of the flanges 33. This double blank will continue to move and after it leaves the unit 35 it is set and the increase in sharpness of curvature of the finger-forming section 32a of the blank by this reforming operation creates a memory factor which, in the finished binder, will always tend to cause the fingers to curl into association with the backbone. The temperature of the plastic material as it emerges from the extrusion die will be from approximately 380° F. to 340° F. and as it leaves the unit 35 will be approximately 350° F. to 330° F. As a specific example, we have found that in using polyvinyl chloride the extruding temperature is about 360° F. and the reforming temperature is about 340° F.

After the material of the double blank 31a sets, the blank is subjected to another reforming operation to facilitate continuous cutting of the blank. For this purpose the blank 31a is fed continuously through a heating, or heat maintaining, and reforming unit 38. This unit is shown best in Figures 5, 6, 7, and 8. This unit comprises a reforming shoe 39 which is provided with suitable means for heating it. In this unit the temperature of the blank is raised to or maintained at a temperature of about 130° F. to 250° F. to relieve the tension therein without actually melting the material thereof. In the case of polyvinyl chloride, we have found in actual practice that a reforming temperature of about 180° F. is desirable. It will be noted from Figures 5 to 8, inclusive, that the shoe 39 is of flat U-cross section throughout its length, but diverges laterally from a point 42 at its forward end. The shoe is provided with the upstanding flanges 40 at each edge of a flat base plate 41. The plate 41 is horizontally disposed with its flanges 40 disposed upright. However, it will be noted from Figure 6 that the flanges 40 converge at the point 42 at the forward end which is the end that first enters the blank 31a. Furthermore, it will be noted from Figure 5, that the flanges 40 are provided with forward sections 43 that incline upwardly from the point 42 to a point where they merge with the straight horizontally disposed upper edges of the flanges 40. As the blank 31a is passed over the point 42 of the shoe 38, it is gradually spread laterally so that the flanges 33 are moved away from each other and inverted and at the same time the section 32a is flattened. As it leaves the unit 38, the reformed double blank 31b will be of flat U-shaped cross section with the backbone-forming flanges 33 of the blank reversed from the depending position shown in Figure 7 to the upstanding position shown in Figure 8 and with the flanges 40 of the shoe 38 beneath the lips 34 of the backbone-forming flanges 33. Furthermore, the finger-forming part of the blank will be in the form of the flat section 32b. This flat U-shape cross section will facilitate subsequent cutting of the blank 31b.

The next step is the cutting operation which is illustrated in Figures 9 to 13. During this cutting operation the single double blank 31b which is shown in Figures 10 and 11 in the form it has as it enters the cutting unit 45 is cut into a pair of mating blanks 31c and 31d of the type shown in Figures 12 and 13. This cutting is accomplished substantially without the waste of any material.

The cutting unit 45 (Figure 9) comprises the upper cutter wheel 46 and the lower wheel 47 which has a smooth circumference. The spacing between these wheels will be just sufficient to permit the passage of the blank 31b therebetween. The structure of the cutting unit is illustrated in detail in Figures 14 and 15. It will be noted from Figure 14 that the circumference of the wheel 46 is provided with a series of radial blade-receiving slots 48 spaced uniformly angularly therearound. These slots 48 will receive the cutter blade 49 and a shoulder 50 is provided on the wheel to limit inward movement radially of the blade 49. This blade, as shown in Figure 15, is bent into transverse loops 52 which will be properly spaced to fit into the slots 48. These loops will, in plan, correspond to the shape and size of the fingers to be produced in the blank.

It will be apparent that as the blank 31b passes through the cutting unit 45, the blade 49 will serve to sever the blank into two separate identical blanks 31c and 31d. Each of these blanks will include the backbone-forming flange 33 and the fingers 32d extending laterally therefrom. Instead of one blade 49 a series of bands or blades may be used.

The blanks 31c and 31d are now subjected to a series of operations to curl the fingers 32c into association with the backbone 33. Both of these blanks are preferably passed continuously through the forming operations which are now to be described. However, in the drawings, we illustrate only one of these blanks 31d passing through these operations and our description will be confined to the one although it will be understood that the other blank 31c will be subjected to identical operations. These reforming operations are illustrated in Figures 16 to 23.

The reforming operation is accomplished in a reforming unit 55. During this reforming operation the blank 31d is brought up to a temperature ranging from 130° F. to 250° F. in order to relieve the tension therein without actually melting the material thereof. We have found that a temperature of 180° F. is desirable if the thermoplastic material being used is polyvinyl chloride. For this purpose, as shown in Figure 1, as the blank enters the unit 55 it is passed through heating means 54.

The unit 55 comprises a transporting belt 56 which is driven continuously and which will support the flat fingers 32d of the blank 31d. This belt is an endless flexible belt supported at its opposite ends by the rollers 57 and 58. In initially installing the belt, it is first passed around the rollers 57 and 58 and then the rollers are swung about the longitudinal axis of the belt 180 degrees to twist the belt and both rollers will be driven in opposite directions. Associated with the twisted belt 56 is a forming cone 59 within which the belt will pass and which will be so shaped that it will cause the belt to act on the blank contacting therewith to curl the fingers into association with a mandrel 53. This mandrel 53 is supported from above at its forward end only by means of a pivot 53a so that it is free to float laterally. It extends substantially the full length of the forming cone 59, as shown in Figures 16 and 17, and is tapered at both ends. The mandrel 53 throughout most of its length is of a cross-sectional shape exactly corresponding to that of the finished binder as shown in Figures 20 and 21.

For propelling the blank 31d through the unit 59, two continuously driven endless bands 60 and 61 are provided. These bands are vertically disposed and pass around vertically disposed sets of rollers 62 and 63, respectively. The inner flights of the belts 60 and 61 are disposed in contact throughout the length of the belt 56. All of the belts are driven continuously at the same linear speed.

As the blank 31d enters the unit 55, it passes into an upwardly inclined channel-shaped guide 64 as shown in Figure 19. This guide will guide the flange 33 of the blank up between the converging bands 60 and 61. The lip 34 on the upper edge of the flange 33 will be positioned over the upper edge of the band 60 and at this time the flat fingers 32d will merely rest on the belt 56. The blank 31d will then be moved along continuously by the travelling belt 56 and the bands 60 and 61 which are gripping the flange 33. The blank will enter the forming cone 59 and as it enters the cone, the upright flange 33 will be disposed between the bands 61 and 60 and the flat side of the mandrel 53 will be contacted by the band 60 and the fingers 32d will pass beneath the mandrel. Due to the action of the cone and the twisted belt 56, the fingers 32d will be gradually swung upwardly and horizontally over the mandrel, as shown in Figure 20, and over the upper lip 34 of the flange 33 at the same time that the flange 33 is held vertically by the cooperating bands 60 and 61. Continued movement through the forming cone will swing the fingers 32d downwardly into vertical depending position, as shown in Figure 21. Further movement will bring the blank off the belt 56 and off the mandrel 53 but, as shown in Figure 22, the bands 60 and 61 will still engage the flange 33 and the outer extremities of the fingers will be vertically disposed outside the band 61 and outside the flange 33.

Thus, the blank 31d in its passage through the unit 55 is reformed by curling it around the mandrel 53 through the cooperative action of the cone 59 and the belt 56. It is reformed from its J-shape shown in Figure 18 into the blank 31e shown in Figure 22 wherein the fingers 32e are curled around and outside the backbone flange 33. Friction on the plastic is reduced since the binder is engaged by the belts 56 and bands 60 and 61 which move the plastic along therewith.

As the blank 31e leaves the unit 55, it is necessary to strip it from the bands 60 and 61 and simultaneously position the vertical portions 32e of the fingers within the backbone-forming flange 33. This is accomplished with the stripper means illustrated in Figure 23. However, before it is subjected to this stripper unit, the plastic blank should be cooled to a temperature below 100°

F. which can be accomplished with the cooling unit 66 located at the outlet end of the cone 59, as shown in Figure 1.

The stripper means comprises a stripper rod 67 which is directed laterally and inwardly adjacent the point where the bands 60 and 61 diverge. The forward end of this rod 67 is pointed as indicated at 68 and is so positioned that as the blank 31e passes off the belt 56, the point enters into the blank. The forward end of the rod 67 is also provided with a laterally enlarged cam portion 69 as illustrated best in Figure 23. As the blank 31e passes onto the cam portion 69, the flange portion 33 of the blank is deflected laterally in one direction while the curled fingers 32e are deflected laterally in the opposite direction. Deflection of the flange 33 moves the lip 34 off the upper edge of the band 60 and deflection of the fingers 32e brings them laterally within the flange 33. At the same time the binder is moved downwardly, due to the inclination of the rod 67, until it is below the band 60, when the flange 33 is permitted to snap back into its normal vertical position. However, by this time the fingers 32e have passed off the cam portion 69 and onto the straight portion of the rod 67 which will be of substantially the same diameter as the rings in the final binder. Since the fingers 32e snap into position on the rod 67 before the flange 33 comes back to its normal position, the fingers will now be located inside the backbone-forming flange 33 as shown in Figure 24.

After the binder blank 31e leaves the stripping means it may be subjected to a shear unit 70 shown in Figure 1 which may travel with the binder blank during the shearing action and sever it into binders of desired length.

The binder 31f shown in Figure 24 will consist of the flat backbone 33f with the inwardly turned lip 34f on its one edge and with the curved fingers 32f curling from the other edge around and within the flange 34f and with the straight portions 32g of the fingers bearing against the inside of the backbone 33. Because of the straight or vertical backbone 33f and the similarly positioned finger portions 32g as viewed in Figure 24, removal of sheets will be facilitated because it will not be necessary to spread the rings so much to move the flat finger portions 32g away from the flat backbone 33f. Also, the vertical portions 32g of the fingers will normally be positioned below the locking lip 34f which will serve to keep the sheets in place. Furthermore, the outer flat surface of the backbone 33f provides a flat surface for receiving printing.

It will be apparent from the above description that we have provided a novel continuous process whereby the binder blank is extruded continuously from thermoplastic material, is subjected continuously to a forming operation which establishes the desirable memory factor therein, is then reformed into a desirable shape to permit cutting, the cutting being accomplished without any substantial waste of material, and is finally reformed into the finished binder of proper size and shape. The finished binder will be such that the memory factor therein will tend to keep the fingers or rings in association with the binder even under high temperature conditions. Also, the binder is novel in itself and is so designed that release of the sheets is facilitated when the binder is positively spread but the sheets are normally securely locked in position.

Various other advantages will be apparent from the preceding description, the drawings, and the following claims.

Having thus described our invention, what we claim is:

1. The method of forming a plastic binder of the type which includes a continuous backbone and a plurality of rings at longitudinally spaced intervals each of which has one end attached to the backbone and a free end associated therewith, which comprises extruding the blank in a form having a backbone-forming flange and a flatly curved finger-forming portion attached thereto, reforming the blank by curving the finger-forming portion more sharply into association with the backbone-forming flange to provide a memory factor therein which will tend to cause the subsequently formed fingers to curl into association with the backbone, flattening the blank to facilitate cutting thereof to form a blank having the continuous backbone with the fingers extending laterally therefrom, cutting the blank to form the fingers attached to the backbone and then forming the blank into its final shape with the fingers curled into association with the backbone to form sheet-retaining rings.

2. The method of forming a plastic binder of the type which includes a continuous backbone and a plurality of rings at longitudinally spaced intervals each of which has one end attached to the backbone and a free end associated therewith, which comprises extruding a double blank, reforming the double blank to provide a memory factor therein which will tend to cause the subsequently formed fingers to curl into association with the cooperating backbone, flattening the double blank to facilitate cutting thereof, cutting the double blank to sever it into a pair of separate mating blanks each of which has the continuous backbone with the fingers extending laterally therefrom, and then forming each blank into its final shape with the fingers curled into association with the backbone to form sheet-retaining rings.

3. A method according to claim 2 wherein the blank is extruded as a continuous strip and all the operations are performed during the continuous movement of the strip.

4. The method of forming a plastic binder of the type which includes a continuous backbone and a plurality of rings at longitudinally spaced intervals each of which has one end attached to the backbone and a free end associated therewith, which comprises extruding a double blank which will be of flat arcuate form with flanges on each edge directed inwardly and upwardly towards each other with the flanges in substantially the form that the final backbone of the finished binder will have and with the flat arcuate section between the flanges of sufficient width to provide for the formation therefrom of fingers of proper length, and after extrusion and before the extruded blank sets establishing a memory factor, which in the finished binder will always tend to cause the fingers to curl up and extend into association with the backbone, by forming the flat arcuate finger-forming section into a curvature of shorter radius so that the backbone-forming flanges are disposed side-by-side almost in contact with each other, permitting the plastic material to set, and then forming the double blank into a flat U-form with the finger-forming section completely flat transversely and with the backbone-forming flanges upstanding at each edge thereof, cutting the double blank into two continuous mating single blanks each having an upstanding backbone-forming flange and longitudinally spaced ring-forming fingers extending laterally therefrom, and then reforming each single blank so that the fingers are curled up into association with the backbone.

5. A method according to claim 4 wherein the double blank is extruded as a continuous strip and all the subsequent operations are performed during the continuous movement of the strip.

6. A method according to claim 5 wherein the reforming of each single blank so that the fingers are curled up into association with the backbone is accomplished by passing the single blank into association with an inner forming member of substantially the cross-sectional form of the finished binder and an outer forming member which will gradually shape the blank around the inner forming member.

7. A method according to claim 6 in which the cooperating inner and outer former members position the ends of the fingers outside the backbone of the blank and the blank is then removed from the forming members and the ends of the fingers are positioned within the backbone.

References Cited in the file of this patent

UNITED STATES PATENTS

| | | |
|---|---|---|
| 1,949,226 | Wallace | Feb. 27, 1934 |
| 2,044,138 | Unger | June 16, 1936 |
| 2,241,813 | Gowdy | May 13, 1941 |
| 2,294,555 | Hendrie | Sept. 1, 1942 |
| 2,299,061 | Spinner | Oct. 13, 1942 |
| 2,323,862 | Zimmerman et al. | July 6, 1943 |
| 2,399,422 | Back | Apr. 30, 1946 |
| 2,454,194 | Maynard | Nov. 16, 1948 |
| 2,525,284 | Camp | Oct. 10, 1950 |
| 2,546,069 | Hart | Mar. 20, 1951 |
| 2,717,423 | Uhlig et al. | Sept. 13, 1955 |
| 2,782,851 | Gazette | Feb. 26, 1957 |
| 2,821,155 | Sackel | Jan. 28, 1958 |